United States Patent
Denzler et al.

(10) Patent No.: US 8,509,475 B2
(45) Date of Patent: Aug. 13, 2013

(54) IDENTIFICATION METHOD

(75) Inventors: Oliver Denzler, Bottmingen (CH); Christoph Weis, Muehllheim (DE)

(73) Assignee: Neoperl GmbH, Muellheim (DE)

( * ) Notice: Subject to any disclaimer, the term of this patent is extended or adjusted under 35 U.S.C. 154(b) by 407 days.

(21) Appl. No.: 12/934,909

(22) PCT Filed: Feb. 19, 2009

(86) PCT No.: PCT/EP2009/001180
§ 371 (c)(1), (2), (4) Date: Sep. 27, 2010

(87) PCT Pub. No.: WO2009/118081
PCT Pub. Date: Oct. 1, 2009

(65) Prior Publication Data
US 2011/0025876 A1 Feb. 3, 2011

(30) Foreign Application Priority Data
Mar. 28, 2008 (EP) ..................................... 08005952

(51) Int. Cl.
*G06K 9/00* (2006.01)
*H04N 5/228* (2006.01)

(52) U.S. Cl.
USPC ........................................ 382/100; 348/222.1

(58) Field of Classification Search
USPC ................. 382/276, 100, 106, 136, 165, 209, 382/278; 348/222.1
See application file for complete search history.

(56) References Cited

U.S. PATENT DOCUMENTS

| | | | |
|---|---|---|---|
| 5,719,951 A | | 2/1998 | Shackleton et al. |
| 2002/0102966 A1 | | 8/2002 | Lev et al. |
| 2002/0184203 A1 | | 12/2002 | Nastar et al. |
| 2004/0208372 A1 | | 10/2004 | Boncyk et al. |
| 2006/0093333 A1* | | 5/2006 | Daurensan et al. ........... 386/106 |
| 2007/0036469 A1 | | 2/2007 | Kim et al. |

FOREIGN PATENT DOCUMENTS

| | | |
|---|---|---|
| DE | 691 31 350 T2 | 12/1999 |
| DE | 102 46 900 A1 | 4/2004 |
| EP | 1 650 678 A1 | 4/2006 |
| EP | 1 737 198 A2 | 12/2006 |
| WO | WO 01/44887 A2 | 6/2001 |

OTHER PUBLICATIONS

M. Yamamuro, et al., "ExSight-multimedia Information Retrieval System", 20th Annual Pacific Telecommunications Conference, Proceedings Pacific Telecommun. Council, 1998, pp. 734-739, XP008107734.

Giancarlo Iannizzotto, et al., "Design and Implementation of a content-based Image Retrieval Tool", Proceedings International Symposium on Software Engineering Forparallel and Distributed Systems, Jan. 1, 1997, pp. 304-310, XP002145773.

(Continued)

*Primary Examiner* — Yon Couso
(74) *Attorney, Agent, or Firm* — Crowell & Moring LLP

(57) ABSTRACT

A method for identifying an object involves transmitted at least one electronic image of the object to be identified to an evaluation unit. The electronic image is compared in the evaluation unit for matches with at least one electronic image of the object to be identified stored in a database, or at least one object having an identical or similar shape, and the evaluation unit then outputs the data stored in the database for the at least one image detected as a sufficient match.

20 Claims, 1 Drawing Sheet

(56) References Cited

OTHER PUBLICATIONS

Rajiv Mehrotra, et al., "Similar-Shape Retrieval in Shape Data Management", Computer, IEEE Service Center, Sep. 1, 1995, pp. 57-62, vol. 28, No. 9, XP000528009.

Davood Rafiei, et al., "Efficient retrieval of similar shapes", VLDB Journal Springer-Verlag, 2002, pp. 17-27, vol. 11, No. 1 XP002534286.

PCT/IPEA/409 Form including English translation (Eleven (11) pages), Jul. 20, 2010.

PCT/ISA/237 Form including English translation (Nine (9) pages), Jul. 13, 2009.

International Search Report including English translation dated Jul. 14, 2009 (Six (6) pages).

* cited by examiner

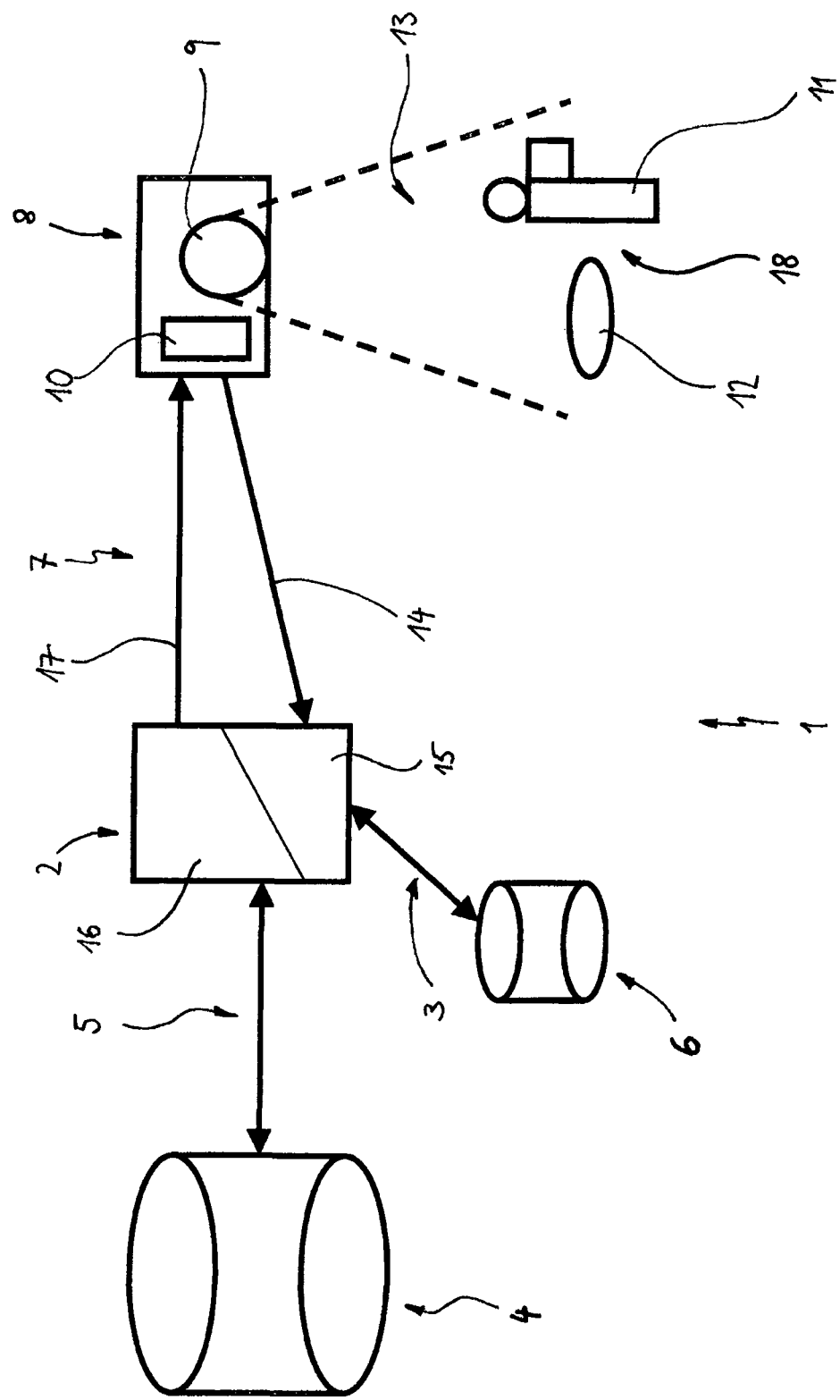

IDENTIFICATION METHOD

CROSS REFERENCE TO RELATED APPLICATIONS

This application is a national stage of PCT International Application No. PCT/EP2009/001180, filed Feb. 19, 2009, which claims priority under 35 U.S.C. §119 to German Patent Application No. 08 005 952.0, filed Mar. 28, 2008, the entire disclosures of which are herein expressly incorporated by reference.

BACKGROUND AND SUMMARY OF THE INVENTION

The invention relates to a method for identifying an object and an apparatus.

For customers of a product, or of a distributor who has a highly varied range of products, it can often be difficult to survey the range of products offered and to identify, in particular, a replacement part when selecting such parts. This difficulty is encountered in particular when the parts offered differ mainly in terms of technical features with which the actual prospective buyer, as an interested layman, is not very familiar. The prospective buyer often does not wish to spend the effort to pour through the technically necessary subtleties, or, when making the purchase decision is subject to sensory overload that causes him/her to feel overwhelmed. In this case, the prospective buyer will in all likelihood select the next-best replacement part, and will determine with some frustration that the repaired object is now not fully functional after he/she returns home after the purchase or uses the replacement part at a later time. He/she will easily place the blame for the error on the producer or distributor.

On the other hand, the manufacturer or distributor of a product must make every effort to offer the widest range of variants for each product line in order to satisfy the raised level of customer demands in terms of optimal performance and maximum adaptation to special regional circumstances, while taking into account the increased need for individualization.

Exemplary embodiments of the present invention enable the selection of the correct replacement part from a product line with a wide range of variants in the most error-free manner possible.

In particular, exemplary embodiments of the present invention provide a method for identifying objects in which in a first procedural step at least one electronic image of the object to be identified is transmitted to an evaluation unit, by an approach wherein the electronic image in the evaluation unit is correlated to matches with at least one electronic image of the object to be identified that is stored in a database, or at least of a form-identical or form-analogous object, and wherein the evaluation unit then outputs data that have been stored in the database for the at least one image that has been recognized as being a sufficient match. Using a camera or a general optical recording device, the electronic image can be generated directly as a photocopy of the object to be identified or by scanning from an existing image of the object. The invention in particular exploits the surprising insight that the customer searching for a replacement part does not perform an elaborate search in comprehensive catalogs based on the entire object requiring repair but instead uses the information about the required part which is contained in the part to be replaced, the object to be identified, that is, the replacement part, but which is generally not completely discernible to him/her as a layperson, and does so by transmitting this information to an evaluation unit in the form of an image. Based on its higher level of technical expertise and/or preprogrammed routines, the evaluation unit takes on the job of deriving the relevant information from the graphic representation. This evaluation unit can comprise an experienced expert operating one or more databases who recognizes and identifies the image, or uses a defined flowchart to launch an appropriate search. The result thus found is then sent back to the sender of the electronic image and serves as a guide during the purchase. As a result, errors during the purchase decision are virtually eliminated.

A particularly rapid reaction to the customer's inquiry, that is, the transmission of an image, is generated, however, if the evaluation unit performs computer-implemented image recognition, from the result of which, based on rules stored in a database, a search query is devised and launched in one or more databases, including those connected to the Internet. For example, automatic image recognition is able to be effected as specified in DE 691 31 350 T2. The factor that is advantageously exploitable to do this is the fact that the sent image exists in electronic form, in other words, is digitized, and is readily available for computer-implemented further processing. The searched result is in turn provided to the customer or prospective buyer and significantly reduces non-appropriate purchases.

The image recognition can account for geometric similarities with features from groups of objects stored in the databases. For example, what is first able to be performed is form recognition of the outline or color recognition, and the databases allow for sorting based on these kinds of criteria.

The stored data for the recognized image can contain the designation, for example, type number or trade name, manufacturer, physical properties, production, technical history of creation or origin, at least one possible supplier—for example, at an online shop plus indication of direct links, and/or a price range for the purchase price and/or additional information about the searched replacement part. However, the data output by the evaluation unit can refer to the object to be identified, or to a replacement part or component associated with the object to be identified. The category to which the imaged object belongs—for example, the device on which the object to be identified is normally provided or the product line to which it belongs—can thus be displayed to the buyer. For example, the invention also makes it possible to locate the original matching lamp shade for a lamp base acquired second-hand, or more generally, to locate some other supplemental or accessory part that aesthetically, functionally or historically matches the existing part.

One embodiment of the invention can provide an approach in which the data set specified for the match and/or the output data is/are limited by preselection to a subset of the images stored in the database or of the data associated with the stored image. This can be effected, for example, through additional information that the customer adds to his/her image query, or based on information that is derived from the sending location or the path which the image query has taken to the evaluation unit. For example, the evaluation unit can thus relate to country-dependent features that apply to the sender of the image query—features of which the sender is often unaware since he/she considers them to be obvious or does not even perceive them.

A pre-selection can be made in the evaluation unit based particularly on search-specific entered data, based on the data-processing or data transmission system transmitting the image of the object to be identified, and/or based on reference objects additionally depicted in the transmitted image. The data-processing or data transmission system can form a link in the transmission chain between sending location and evaluation unit. The use of a reference object enables compensation to be effected for special characteristics that arise from the recording technology and/or from the optical properties of the equipment used to generate the electronic image. The reference object can be a normally available object that does not necessarily relate to the object to be identified—for example, a matchbox, a match, a commercially available folding ruler, a coin, a credit card or money card, a postage stamp, or a reference object provided by the manufacturer or distributor, for example, a specially designed label or an identification mark. Other reference objects can be used, although it is particularly advantageous if the reference objects are identifiable based on a feature that is unaffected by enlargement during imaging or by distortions of perspective. The reference objects provided by the manufacturer or distributor can also contain additional information about the location of their availability, and thus about locally applicable secondary conditions that must be taken into account when identifying the searched object. The customer, i.e., the requester, can thus be warned that the object sought by him/her cannot be used at his/her location, or is not likely to provide the optimum performance.

Provision is made according to the invention in which the reference objects are identifiable based on an identifier attached to the surface, and in which the characteristic data for each reference object includes at least one linear measurement. This type of identifier can be implemented, for example, as an outline shape or as an identifier applied to the surface of the reference object, such as an inscription label and/or pattern. Based on the described use of at least two independent features, the reference object can be used as a point of reference. An identification of the reference object is first made based on features that do not depend on the scale of the image and the imaging perspective, and analogous distorting or falsifying effects, then the information obtained by identification, in particular, information relating to a characteristic parameter of the reference object, is supplied to identify the scale and and/or the perspective distortion when the electronic image was recorded. Using this information, imaging of the searched object, that is, of the replacement part, can be effected by computer-implemented processing of the electronic image for a standard size and in a standard form, thereby simplifying the image recognition, database search, and image matching.

In one embodiment of the invention, provision can be made in which data, in particular, image data are stored for a set of objects, and data, in particular, associated characteristic data such as dimensions, shapes, colors are stored for a set of reference objects in a second database, and whereby in a first step at least one electronic image of the object is generated together with a reference object from the second database, in second step the image is transmitted to an evaluation unit, in a third step the evaluation unit automatically identifies the reference object on the image, in a fourth step the evaluation unit derives characteristic data of the imaged object from the characteristic data of the identified reference object stored in the second database and from the transmitted electronic image, in a fifth step the evaluation unit uses the derived characteristic data of the imaged object to identify this object in the first database, and in a sixth step the evaluation unit outputs an identification number of the identified object.

To this end, the method provides an approach in which a list of possible, preferably generally and normally available, reference objects is known to the customer when the electronic image is generated, from which list he/she selects at least one reference object which he/she records together with the searched object, that is, the replacement part. As a result, information usable for automated image recognition is permanently linked to the image query. Based on the selection of the reference object, the customer can also simplify a preselection of the relevant subset, for example, by selecting a different reference object for car replacement parts than for motorcycle replacement parts.

The method according to the invention can provide an approach in which the reference objects are identifiable based on an identifier attached to the surface, and in which the characteristic data for each reference object includes at least one linear measurement. This type of identification can be implemented, for example, as an outline shape or as an identifier applied to the surface of the reference object, such as an inscription label and/or pattern. Based on the described use of at least two independent features, the reference object can be used as a point of reference. An identification of the reference object is first made based on features that do not depend on the scale of the image and the imaging perspective, and similar distorting or falsifying effects, then the information obtained by identification, in particular, information relating to a characteristic parameter of the reference object, is supplied to identify the scale and and/or the perspective distortion when the electronic image was recorded. Using this information, imaging of the searched object, that is, of the replacement part, can be effected by computer-implemented processing of the electronic image for a standard size and in a standard form, thereby simplifying the image recognition, database search, and image match.

A particularly easy-to-manipulate method is found when the reference objects are coins if the identifier is an impression and if the at least one linear measurement is a diameter of the given coin. The customer can thus use his/her readily-available reference object since it has been found that the impression on a coin allows for particularly easy identification of the reference object. The diameter of the coin can be used as the characteristic parameter since it is particularly easy to electronically correct the perspective distortion of a circular shape, for example, by extension or compression along a semi-axis of the ellipse that corresponds to the circular contour of the coins in the image. The evaluation unit can account for the natural color of the recognized coin in order to correct the color value of the electronic image so as to provide additional information for identifying the searched object.

Alternatively, provision can be made in which the reference objects are credit cards or other cards for electronic payment transactions, where the identifier is the card number and the at least one linear measurement is the edge length of the specific card. This also produces the described advantages in terms of general availability and simple geometry. Other groups of reference objects can be advantageously used. For example, the reference objects can be an adhesive label with a printed reference scale and/or reference color. Reference objects of this type can be procured, for example, at the distribution center of the manufacturer or of the distributor, and can be take by the customer to the location of the replacement part if, for example, shipping is possible only with great effort.

In order to more easily provide reference objects usable by the method according to the invention, provision can be made in which at least one reference object is stored as a printable file on a storage medium. This storage medium can be portable or can be accessible to anyone or to an authorized group of persons through an Internet address. In this case, provision is made in which the user of the method according to the invention prints out the reference object before use. One approach is to create the printout on self-adhesive paper or self-adhesive labels.

Provision can thus be made in which the provider of the identification method according to the invention provides a download on a homepage in the Internet that can be downloaded and printed out by the user. Geometric reference objects are already depicted on this printout, for example, in the form of lines or squares that enable the user to better assign the pattern to the groups of products.

To simply acquisition of the perspective distortion in the recorded image of the object to be identified, provision can be made in which the reference object has at least one marker for the positioning and/or orientation of the object to be identified in its position of use. This orientation or positioning can be effected relative to at least one reference object and/or relative to a camera for recording the electronic image of the object to be identified.

Provision can be made in which the position of the object to be identified, that is, of a pattern on which the reference object, which can be provided as a printed sheet, is already delineated, for example, by an axis intersection. What is advantageous is that this prepositioning simplifies the dimensional scanning or metrological evaluation of the electronic image.

These actions involving the already printed-out reference geometries relative to the component to be analyzed allow the perspective distortion in particular to be significantly simplified and improved.

One embodiment of the invention can provide an approach in which in the third step the electronic image is electronically distorted in such a way that the identified reference object in the electronic image matches the shape of the reference object stored in the second database, after which at least one linear measurement for the imaged object is determined from the distorted electronic image.

A particularly accurate search query to the relevant databases can be formulated if the symmetry type and at least one characteristic parameter of a pattern provided for the imaged object is determined by automatic pattern recognition in the third step. This type of pattern can be provided, for example, on the surface and/or in a material, in particular, as a perforation of the material.

The automatic pattern recognition in the third step can perform at least one two-dimensional Fourier transform of the electronic image. Axes of symmetry and/or grid spacings for the elementary cells of the pattern are easily recognizable in an automated approach by determining the extreme values.

The characteristic parameter determined during pattern recognition in the third step can be a grid constant and/or grid angle. The search query or preselection of the relevant images of objects is thus able to be restricted to those objects which have the relevant characteristic parameter.

The invention is advantageously applicable in general to products of a product line having a multiplicity of individual characteristics that are difficulty to assess, in particular, if these individual characteristics are composed of parts of a modular design or system, and a plurality of rules and dependencies must be taken into account in terms of assembly, that is, the individual parts do not fit in a universal sense. Examples include vacuum cleaner bags, replacement tubes for lamps, car replacement parts, motorcycles, bicycles, in particular, vintage vehicles and/or collectibles, brake linings, spark plugs, windshield wipers, connector systems, pieces of furniture, and the like.

The invention is able to be advantageously used if the objects are aerators, and if the at least one characteristic length is the diameter of the aerator and/or the length of the aerator. It is advantageous in this regard if the information contained in the color, in the geometry of the screen, in the installation dimensions is able to be extracted from the electronic image in a manner unperceived by the user of the method, without the customer having to know at all that, for example, different aerators must be used for various water hardnesses, for various pipeline pressures, and the like.

The pattern provided for the imaged object can be described by the screen of a screen insert.

In one embodiment of the invention, provision can be made in which the evaluation unit—for example, in a third or additional step—determines the color of the imaged object by comparing the color of the imaged object with the color of the reference object stored in the second database. This advantageously allows for the selection of even a color-matching replacement part whenever multiple alternatives are available, or also allows additional information to be taken into account that is encoded in the color. For example, aerators can be marked with the specified flow rate and/or the effective pressure drop in the aerator by the selected color. Since these values depend on the conditions at the place of use, for example, the local water line pressure, any improper selection on the part of the prospective buyer is able to be prevented by the invention by taking this information into account.

A particularly simple way of implementing the method is achieved when the image of the object to be identified is recorded—for example, in MMS format and/or using a mobile telephone having a camera function—and transmitting this (for example, through a mobile radio network) to the evaluation unit, and when the identification number or a request to record another image (e.g., from another viewing angle) preferably connected to a reference identification, is sent to the sender (e.g., the mobile telephone). As a result, the electronic image is generated by selecting the data format and/or the recording component which essentially every potential customer has available today, and the same component is able to be used for sending the request or receiving the result. The method is thus designed so as to be implementable on a universally available apparatus in which a device existing within the customer's private sphere of availability, the mobile radio device, forms a part, and in which a public communications system, the Internet or a mobile radio network forms a part, wherein the described components interact with additional components—for example, the evaluation unit—in order to implement the method.

Other image formats such as jpeg, tiff, pdf, png, and the like can also be advantageously used.

The transmitted image can contain information on the recording component, for example, for example, resolution, enlargement, exposure data, and the like, or this type of information is linked to the image.

The probability of correct assignment is increased if the views from multiple viewing angles are stored in the database for each object.

One aspect of the invention can provide an approach in which not all detected objects are output, but instead the search query, and thus the identification, are provided with secondary conditions that effect a restriction to certain product lines, including those that are of superior quality to the imaged replacement part.

One aspect of the invention can provide an approach in which in response to an unsuccessful search in the available databases and/or unsuccessful identification attempt for the reference object and/or other circumstances preventing a result, a further inquiry and/or request is made to the creator of the image to send another image, from a different distance and/or containing a different reference object and/or from a different viewing angle, or to engage an expert to manually process the request.

One aspect of the invention can provide an approach in which the image of the object to be identified is recorded by a device with camera function that is installed in a selling apparatus, in which the image is transmitted over the Internet or mobile radio network to the evaluation unit, and in which the identification number is transmitted over the Internet or mobile radio network to the device with camera function, then displayed or output on the device with camera function. A device of this type can be advantageously installed at the place of sale, and the prospective buyer only has to place his/her replacement part on the designated spot, then almost instantaneously receives the requested information for the inserted part, and/or information about a functionally superior and/or less expensive and/or more-environmentally-friendly replacement item, and/or additional installation or care/maintenance tips.

The invention furthermore relates to a method for selecting a replacement part for a superordinate object or for a production system in which at least one picture of an original part to be replaced and/or of a superordinate object is transmitted, the original part and/or the object are identified based on the picture, at least one replacement part is assigned to the original part and/or object to be identified, and a list of matching replacement parts is output. The output can be implemented by printout, announcement and/or notification and/or delivery of the matching original part stored in a storage bin, or by some other means.

To solve the problem, the invention furthermore provides an approach in which a receiving unit is created for an apparatus to identify an object, which apparatus is designed to receive the searched object, wherein the apparatus has a camera to generate an electronic image of an object inserted into a receiving unit, a communications component to transmit the electronic image to an evaluation unit, and a communications component to receive identification information for the electronic image as determined by the evaluation unit. The receiving component can be in the form of, for example, a rack or holder. The camera can be a commercially available camera or camera integrated in the apparatus that has or does not have a focusing function. Marks can be applied to the receiving unit, or special shapes are designed that are recognizable together with the object on an electronic image generated by the camera, that is, for example, on a digital photo of the object, and display information on size relationships and/or color values and/or the apparatus's place of installation and/or the time the electronic image was created. The communications component include, for example, the requisite components to effect a transmission of data, in particular, of the electronic image, through a data transmission network, for example, a mobile radio network or the Internet or a telephone line, in other words, in particular, a processing component and transmitting component, or receiving component, for example, a mobile radio transmitting and receiving unit, and/or network card and Internet connection, and/or telephone or fax connection. The apparatus can be installed at a permanent location, for example, in a selling device, supermarket, home improvement store, or the like.

In one embodiment of apparatus according to the invention, provision can be made in which an output component outputs the received identification number. The output component can be designed as a display component, for example, a display, as mechanism to output a printout, for example, a printer, and/or as a component for the output of speech. An advantageous aspect is that a customer can insert into the receiving unit of the apparatus an object, for example, a defective part that he/she would like to exchange for a new similar part, and will receive from the apparatus a response that supplies information about the inserted object within a short time span, essentially immediately or without delay.

In one embodiment of apparatus according to the invention, provision can be made in which a stocking unit is provided in which objects are stored, and that a component for selecting an object from the stocking unit and a component for dispensing the object are provided. The stocking unit is designed as an automatically-loadable stocking apparatus, and the component for selecting an object are provided by the automatic pick-and-place system of the stocking apparatus. The automatic pick-and-place system can be designed so that a specified object is selectable in the stocking apparatus and is able to be dispensed through a delivery doorway or the like. The customer thus receives his/her searched object directly.

The apparatus according to the invention can be operated using the method according to the invention.

Other embodiments of the invention are apparent from the claims and the drawings. The invention is explained in detail below with reference to the preferred embodiments.

BRIEF DESCRIPTION OF THE DRAWING FIGURE

The sole FIGURE illustrates an exemplary system and method for identification in accordance with the present invention.

DETAILED DESCRIPTION

An identification apparatus marked as a whole by 1 has an evaluation unit 2 that is connected through the Internet 5 to a first database 4, and through a communications line 3 to a second database 6.

First database 4 contains illustrations for a set of other objects for which identification queries can be formulated.

Second database 6 contains illustrations for a set of reference objects and additional characteristic information for each stored reference object.

In the illustrated embodiment evaluation unit 2 is also connected through a mobile radio network 7 to a mobile phone camera 8 for the purpose of exchanging information. The exchange of information can, however, also be effected through any wired or wireless data telecommunication, or directly on site—essentially acting as an electronic expert.

Mobile phone camera 8 has an objective lens 9 to record the image and a display 10.

To identify a search object 11, this object is recorded photographically 13 together with a reference object 12 for which at least one image has been stored in second database 6.

The electronic image thus generated in the mobile phone camera 8 is now transmitted as a search query 14 through mobile radio network 8 to evaluation unit 2.

Evaluation unit 2 can be a data-processing system, first uses an image recognition algorithm 15 to identify reference object 12 and processes the electronic image until imaged reference object 12 has a specified standard shape and standard size. In this process, the image of the search object is necessarily modified at the same time.

A search query for first database 4 is now formulated in a matching unit 16 and sent out through Internet 5. The result of this search query is received through Internet 5 and in processed form is relayed to mobile phone camera 8 through mobile radio network 7 as a response 17 and displayed there on display component 10.

If reference database 6, and additionally or alternatively in particular image database 4, are set up in a predetermined data format, the system presented here can also be available to different, possibly even competing, manufacturers or suppliers so as, for example, to facilitate or to automate for them the process of supplying replacement parts or accessories to customers. The differentiation between databases 4 and 6 is not meant in the physical sense but refers simply to the assignment and purpose of the image data and reference data that may be stored on a data medium. The system described can also match those replacement or accessory parts of more recent production with a product stored in the image database, where these replacement or accessory parts are intended to replace any replacement or accessory parts that are no longer available.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for identifying an object, comprising:
    receiving, by an evaluation unit, at least one electronic image of an object to be identified and a reference object, wherein the reference object is identifiable based on an identifier attached to a surface of the reference object and characteristic data of the reference object including at least one linear measurement;
    automatically identifying, by the evaluation unit, the imaged reference object independent of a scale of the imaged reference object;
    using characteristic data of the identified reference object stored in a second database to identify a scale of the received at least one electronic image;
    deriving, by the evaluation unit, characteristic data of the imaged object using the identified scale of the received at least one electronic image;
    correlating, by the evaluation unit using the derived characteristic data of the imaged object, the received at least one electronic image to electronic images of the object to be identified stored in a first database, of at least of a form-identical stored in the first database or of a form-analogous object stored in the first database; and
    outputting, by the evaluation unit, data stored in the first database for the at least one image that has been recognized as being a match based on the correlation,
    wherein the evaluation unit makes a pre-selection based on the imaged reference object.

2. The method according to claim 1, wherein the data output from the evaluation unit relate to the object to be identified, to a replacement part or to a component associated with the object to be identified.

3. The method according to claim 1, wherein a data set determined for the correlation or the output data is/are restricted by the preselection to a subset of the images stored in the first database or of data associated with the electronic images stored in the first database.

4. The method according to claim 1, wherein the identifier attached to the surface of the reference object is an inscription label or a pattern.

5. The method according to claim 1, wherein the imaged reference object is a coin, the identifier is an impression on the coin, and the at least one linear measurement is a diameter of the coin.

6. The method according to claim 1, wherein the imaged reference object is a credit card or other card for electronic payment transactions, the identifier is a card number on the credit card or other card for electronic payment transactions, and the at least one linear measurement is an edge length the credit card or other card for electronic payment transactions.

7. The method according to claim 1, wherein the imaged reference object is an adhesive label with a printed reference scale or reference color.

8. The method according to claim 1, wherein the automatic identification involves electronically distorting the received at least one electronic image in such a way that the identified reference object in the electronic image matches a shape of the reference object stored in the second database, after which the at least one linear measurement of the imaged object is determined from the distorted electronic image.

9. The method according to claim 1, wherein the automatic identification involves determining a symmetry type and at least one characteristic parameter for a pattern present on the imaged object to be identified using automatic pattern recognition.

10. The method according to claim 1, wherein the automatic pattern recognition involves performing at least one two-dimensional Fourier transform of the received at least one electronic image.

11. The method according to claim 9, wherein the determined at least one characteristic parameter is a grid constant or grid angle.

12. The method according to claim 1, wherein the object is an aerator, and the one characteristic data of the object in the received at least one electronic image is a diameter of the aerator or a length of the aerator.

13. The method according to claim 1, wherein a pattern present on the imaged object is described by the inflow and outflow structure of an aerator.

14. The method according to claim 13, wherein the pattern present on the imaged object is described by a side view of the aerator.

15. The method according to claim 1, wherein the automatic identification involves determining a color of the imaged object by comparing a color of the imaged reference object with a color of the reference object stored in the second database.

16. The method according to claim 1, wherein the image of the object to be identified is recorded in an MMS format by a mobile telephone with camera and is transmitted through a mobile radio network to the evaluation unit, and the identification information or a request to record another image from another viewing angle linked to another reference identification is sent to the mobile telephone.

17. The method according to claim 1, wherein the image of the object to be identified is recorded by a device with camera, said device being permanently installed in a selling apparatus, the image is transmitted to the evaluation unit, and the identification number is transmitted to and displayed or output by the device with the camera.

18. An apparatus for identifying an object, comprising:
    a receiving unit that receives a searched object;
    a camera that generates an electronic image of the received searched object;

a communications component that transmits the electronic image to an evaluation unit, wherein the evaluation unit is configured to automatically identify the imaged reference object independent of a scale of the imaged reference object;

use characteristic data of the identified reference object stored in a second database to identify a scale of the received at least one electronic image;

derive characteristic data of the imaged object using the identified scale of the received at least one electronic image;

correlate using the derived characteristic data of the imaged object, the received at least one electronic image to electronic images of the object to be identified stored in a first database, of at least of a form-identical stored in the first database or of a form-analogous object stored in the first database; and output data stored in the first database for the at least one image that has been recognized as being a match based on the correlation.

19. Apparatus according to claim 18, wherein an output is provided to output the received identification information.

20. Apparatus according to claim 18, wherein a storage unit is provided in which objects are stored, and a selecting mechanism that selects an object from the storage unit and a dispensing component are also provided.

* * * * *